March 11, 1930.  D. R. LASIER  1,749,979
DOOR HOLDING MEANS
Filed Oct. 4, 1926  2 Sheets-Sheet 1

Witness:
R. Burkhardt.

Inventor:
David R. Lasier,
By Wilkinson, Huxley, Byron, & Knight
Attys.

March 11, 1930.  D. R. LASIER  1,749,979
DOOR HOLDING MEANS
Filed Oct. 4, 1926  2 Sheets-Sheet 2
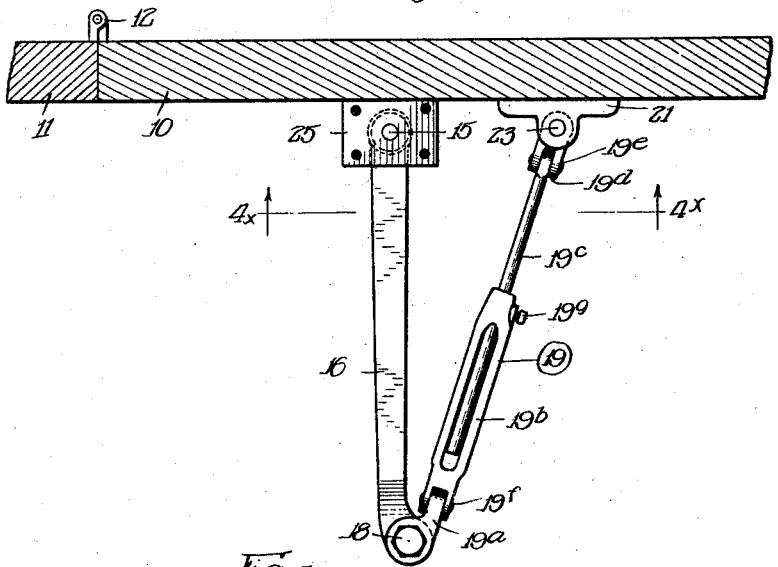
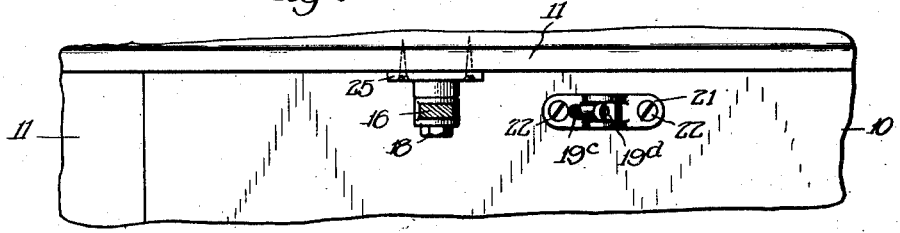
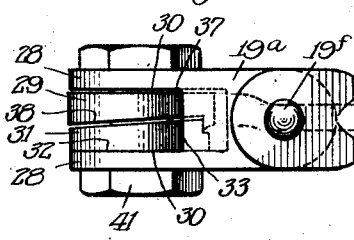
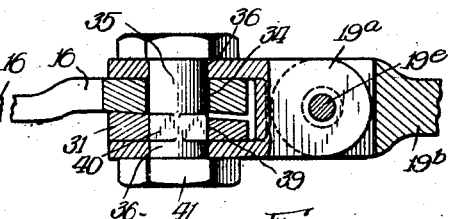
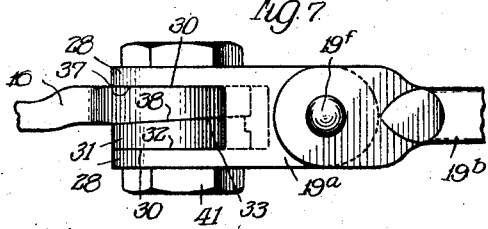
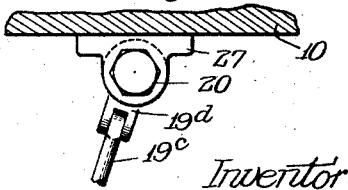
Inventor:
David R. Lasier,
By Wilkinson, Huxley, Byron & Knight
Attys
Witness:
R. Burkhardt Patented Mar. 11, 1930

1,749,979

UNITED STATES PATENT OFFICE

DAVID R. LASIER, OF CHICAGO, ILLINOIS, ASSIGNOR TO NORTON LASIER COMPANY, OF CHICAGO, ILLINOIS, A CORPORATION OF ILLINOIS

DOOR-HOLDING MEANS

Application filed October 4, 1926. Serial No. 139,534.

My invention relates to improvements in means for stopping and holding doors, and more particularly to a type of device utilizing the relative displacement of the door and door frame when the door is opened for effecting a frictional binding by a relative movement between certain parts of a pivoted link connection between the door and door frame.

To this end, I have provided a stopping and holding device for doors comprising two links, the length of which may be adjustable, pivotally connected at their ends, their opposite ends being pivotally connected with the door and door frame respectively, forming three pivots in all, any one of which may be provided with cooperating frictional faces adapted to engage and bind upon relative movement of the parts of the particular pivot as effected by the pivotal movement of the door when being opened.

The means for effecting the frictional binding comprises a head formed at the pivot on one of any of the relatively movable parts, said head having spaced, opposed frictional faces and provided with a washer having a friction face on one side and a cam face on its other side positioned between the friction faces with its cam face spaced from one of said friction faces, the other of said relatively movable parts being provided with a head likewise having a friction face on one side and a cam face on its other side and positioned in the space between the cam face of the washer and the friction face on the first of said heads with the cam faces cooperating, the total height of the portions of maximum thickness of the cam washer and the interposed head being greater than the space between the friction faces of the first named head. A stud is provided forming a pivot for the two relatively movable parts having a portion of its shank squared fitting in a square opening in the washer, the shank being provided with a nut for binding it immovably relative to the first of said relatively movable parts but which can be rotated when the nut is loosened to effect an angular displacement of said washer relative to said first relatively movable part and in this manner adjust angularly throughout the 360° of the pivot, the point at which the portions of the washer and the head of the second relatively movable part of maximum thickness will overlie, or the point at which a frictional binding action is effected.

Inasmuch as the opening movement of the door will effect a relative movement between the parts at any of the pivots of the link mechanism connecting the door and the door frame, the frictional holding means may be placed at any of the pivots, the frictional face requiring merely for a successful operation a relative turning movement between two parts pivotally connected. The selection of a particular pivot for locating the frictional holding means will vary with different installations, it being desirable to avoid dead centers or positions of the link connection at which the translated movement of the swinging door effects only slight relative movement between the parts of a particular pivot especially when this position occurs within a portion of the arc of swing of the door at which a stop and holding action is desired. In order to effect a more positive and efficient action, that pivot is selected which has the greatest relative movement between its parts as translated through the mechanism by the swinging movement of the door during that portion of the arc of swing of the door at which it is desired to stop and hold same.

It is my intention in practicing this invention to use my improved door stopping and holding means on doors equipped with a door check closer in which case the operating levers employed for connecting the door check closer to the door or door frame, depending upon which of these elements the door check closer is mounted, will be replaced by levers constructed according to this invention; or, it is my intention to apply my device directly to doors which are not equipped with door check closers. It is also intended that levers equipped with my improved stopping and holding means be supplied as the operating levers with new door check closers, in which case they may both be mounted at once on new installations.

One of the objects of my invention is to provide a door stop and holding means which is simple in construction, efficient and positive in operation, and which may be readily applied to a door of either hand, and will stop and hold a door in any selected open position.

Another object of my invention is to provide a door stop and holding means provided with frictional faces adapted to cooperate and bind in a manner to stop and hold the door when the door has been opened to any desired extent.

Another object of my invention is to provide a door stop and holding means comprising two relatively movable parts between which relative movement is effected on the opening movement of the door, said parts having frictional and cam faces cooperating in a manner to bind to stop and hold the door at any selected open position of the door.

Another object of my invention is to provide a door stop and holding means of the above described type in which the cam face of one of said relatively movable members is angularly adjustable so that the extent of the relative movement of the two heads may be determined by the position of the cam and the binding action of the frictional faces may stop and hold the door when it has been opened to any predetermined extent.

Another object of my invention is to provide a door stopping and holding means of the above described type adapted for use in conjunction with door check closers or independently thereof as connected directly between the door and door frame on doors not equipped with door check closers.

A further object of my invention is to provide a door stopping and holding arm of the type described in the above stated objects, in which an adjustment may be effected between the points of attachment for the two arms, one of said arms being extensible and provided with pivots to permit vertical displacement of its two ends.

These and other objects are accomplished by means of the arrangement disclosed on the accompanying sheets of drawings, in which—

Figure 3 is a view similar to Figure 2 with the exception that the door check closer is omitted, the two arms being pivoted directly to the door and door frame respectively, mounted on the side opposite to the hinge of the door;

Figure 4 is a cross-sectional view taken on the line $4^x$—$4^x$ of Figure 3, looking in the direction of the arrows;

Figure 5 is a view of a modified form showing the friction device at the door frame pivot connection;

Figure 1:
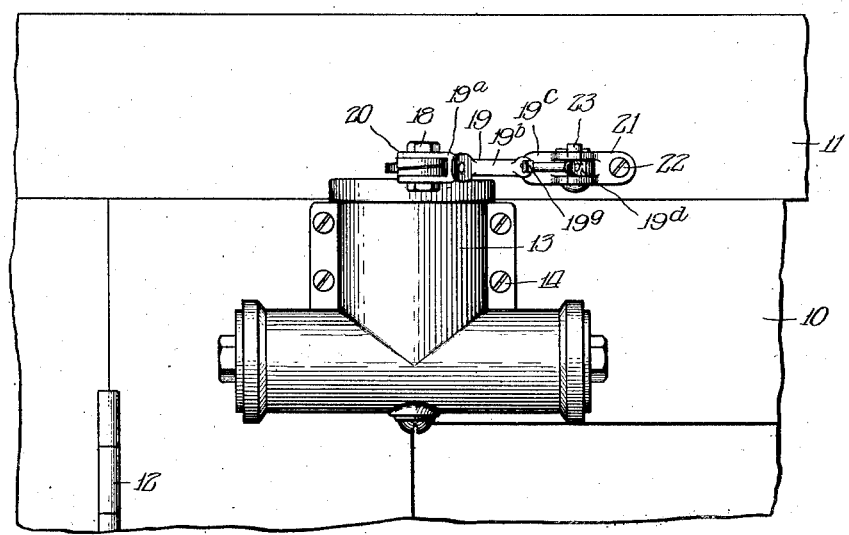
Figure 1 shows a side elevation of my improved door stop and holding means as applied to the operating levers of the door check closer, the friction faces being positioned at the pivot between the outer ends of the two links. The device in this showing is mounted on the hinge side of the door.

Figures 6 and 7 are enlarged side elevations of the friction pivot as seen from opposite sides, showing the relationship of the parts, it being understood that this pivot represents the relatively movable members at any of the pivots of the linkwork and connections between the door and door frame; and, Figure 8 is a cross-sectional view of Figure 7, disclosing the internal structure and the squared portion of the shank fitting the washer so that the washer may be adjusted.

The various novel features of the invention will be apparent from the following description and drawings, and will be particularly pointed out in the appended claims.

Referring to the drawings, it will be noted that my improved invention is adapted to be connected to a door 10 and door frame 11 so that when the door is opened, turning on the hinges 12, a relative movement is effected between the pivoted parts of the connecting linkwork. In the type shown in Figure 1, a door check closer 13 is attached in any suitable manner, as by screws 14, to the upper portion of the door so that the operating spindle 15 will extend above the upper edge of the door in a manner to receive operating link 16, the link fitting on the slabbed end 17 of the spindle and retained by nut 18. Connected at the other end of the link 16 is a second link designated generally 19 pivoted by means of my improved friction stop and holding means designated generally as 20, to be hereinafter more fully described, the other end of the link 19 being pivoted to the door frame by means of the bracket 21 secured by suitable screws 22 and attached by the bolt 23, the cotter pin 24 preventing displacement of the bolt.

The arm 19 is made up of four separate parts to provide for adjustment as to length and flexibility in mounting. The outer end consists of the friction head yoke portion $19^a$ pivoted as by pin $19^f$ to the socket member $19^b$ provided with set screw $19^g$. The rod $19^c$ is retained in the member $19^b$ by the screw in any desired adjusted position and has provided the universal pivot member $19^d$ pivoted at its inner end by the pin $19^e$. It can be readily seen that this arrangement affords adjustability as to length, which will in turn effect the initial angularity between the parts and it also permits the attaching bracket 21 to be connected at a point either elevated or lowered out of the plane of the pivot between parts 16 and $19^a$. Attention is further called to the fact that the two arms of my holding device are pivoted together by a pivot, the center of which lies at the intersection of the planes of the inner faces of the two arms, this type of pivot permitting the arms to be brought practically together in a manner to close the angle between them and yet preventing them from swinging past each other in a manner to reverse their relationship when they are being installed.

Figure 2:
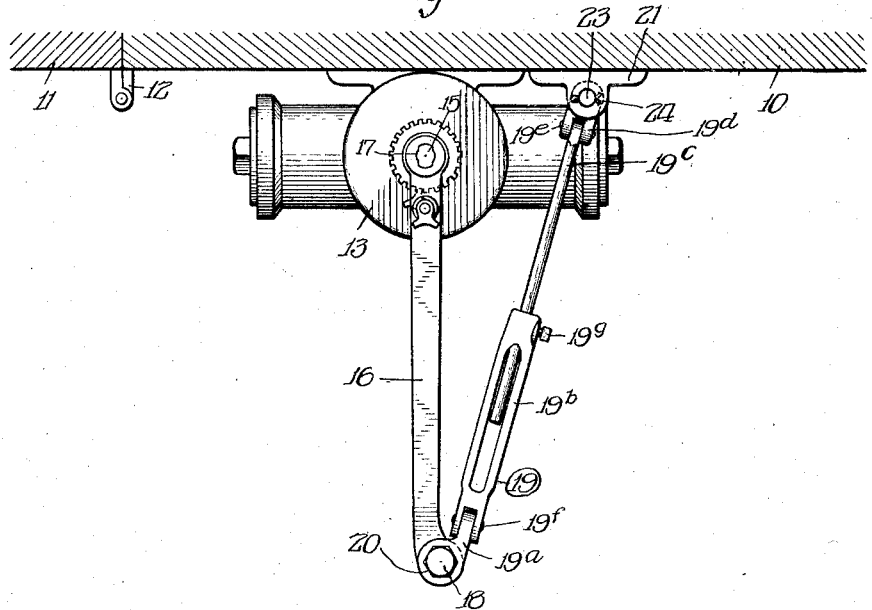
Figure 2 is a plan view of Figure 1.

Figure 3 discloses a device similar to that shown in Figure 2 with the exception that the arm 16 is pivoted directly to a bracket 25 secured to the door instead of to a door check as shown in the other figure. The remaining parts of the device are similar to the form used in the door check type, and will be referred to by the same reference characters.

In the modification disclosed in Figure 5, the friction stop and holding means 20 is positioned at the pivot connection between the link 19 and the door frame 11, the bracket 27 being similar to that shown at 21 in Figure 3 with the exception that it is modified to present two friction faces to form one of the elements of a friction locking means, the structure of which is shown in Figures 6 to 8 inclusive.

The friction holding device disclosed in Figure 6 has two pivoted members, as shown at 19 and 16, having heads at their outer ends, it being understood that these represent two relatively movable parts of any of the pivots, as for instance link 19 and bracket 21, or link 16 and bracket 25 as well as the pivot connecting the ends of the two arms; the structure being the same in all cases. The two relatively movable members are provided with heads 28 and 29, the head 28 taking the form of a yoke having opposed frictional faces 30 spaced apart and receiving between these faces a washer 31 provided on its opposite sides with a frictional face 32 and a cam face 33, the cam face being spaced from one of the friction faces 30. Positioned between the cam face and the friction face is the head 29 centrally bored as at 34 to receive the bolt 35, the bolt being held in holes 36 in the two arms of the yoke to form a pivot connection, the head 29 being further provided with a friction face 37 in engagement with the friction face 30, and the cam face 38 cooperating with the cam face 33 of the washer. It is to be understood that the cooperating cam faces are complementary spiral cams so constructed that during the relative pivoting movement they remain in sliding surface contact throughout their areas and maintaining the outer faces in parallel planes which gradually move toward and away from each other in operation. The washer 31 is provided with a squared opening 39 to receive a squared portion of the shank 40 of the bolt so that rotation of the bolt will rotate the washer, turning movement of the bolt being possible when the nut 41 at its outer end is loosened, nut 41 serving when tightened to bind the bolt and the cam washer fixed relative to the head 28.

In operation, the stopping and holding means may be applied to a door in conjunction with a door check closer, as shown in Figures 1 and 2, or independently of the door check closers, as shown in Figures 3, 4 and 5, the interposition of the door check closer having no effect on the operation of my device. My door stop and holding means may also be applied to a right hand or left hand swinging door with equal degrees of success, the change from one type of door to the other merely necessitating the device be turned over, the stopping and holding operation being accomplished when the angular relation of the two members increases and the angle does increase upon opening the door regardless of which side is up.

An important feature of my invention resides in the fact that I have provided a pivot for the outer ends of the arms which is symmetrical in appearance. This is found to be quite an improvement with reference to the reversibility of the holder when applied to doors of different hand. It can be seen that in installing holders on a pair of doors in a case where two doors are used for a single doorway, that is, one right and one left hand door, that it is important to have the arms symmetrical if a uniform appearing installation is desired. If a pivot was used where one arm is positioned on top of the other instead of using a yoke as in my device, the reversal of one of the arms would cause one inside arm to be up and the other inside arm to be down with the result that a very ugly appearing installation is had. This is also important for the reason that it is found in practice that carpenters will not install the holders with one inside arm up and the other inside arm down because due to the appearance they feel confident that this is wrong.

The result is that on the type of holder where one arm is positioned on top of the other at the pivot which permits the arms to be swung past each other and open up in the opposite direction, that the carpenters mount them to appear symmetrical which results in one arm opening in a direction opposite to that which will cause it to function, and thereby being totally inoperative. Attention is directed to the fact that in my device the arm 16 is slightly bent in a manner to bring the center lines of the two arms 16 and 19 in the same horizontal plane. My device appears substantially the same regardless of the manner it is operated and further, due to the yoke construction, the arms cannot be swung past each other to open in the improper direction and therefore, cannot be improperly installed.

The selection of the particular type, that is, the locating of the friction means at a particular pivot, is dependent upon the type of door and the point along the arc of its opening movement at which it is desired to stop and hold it, the pivot selected being that which by the translated movement of the opening door effects the greatest relative movement between the pivot parts during that portion of the arc when the stopping and holding action is desired. Inasmuch as a relative movement between the two parts, such as 16 and 19 in Figure 6, is effected by the opening movement of the door, it can be readily seen that when the door is opened that the member 19 will rotate on the cam washer 31 to the position shown in Figure 7, at which time the cam faces 38 and 39 cause the friction faces 32 and 37 to wedge against the spaced friction faces 30 thereby preventing any further movement, the cam faces being of such a gradual pitch that due to the great mechanical advantage effected by the lever parts and the door acting as a lever, relatively slight force applied at the door knob will cause the friction faces to wedge and hold the door in its stopped open position.

The type of stopping and holding device shown in Figures 1, 2 and 3, that is, having the friction faces at the pivot between the ends of the two links, is called the 90° type for the reason that during the opening movement of the door the movement of the parts of this pivot only cause a relative displacement of these parts of about 90°. The type disclosed in Figure 5, namely, the type having the friction stop at the pivot connecting the arm 19 to the door, is called the 180° type for the reason that a 180° movement is effected at this pivot when the door is opened. It has been found in practice that the 90° type is the most satisfactory, provided it is desired to provide a means for stopping and holding the door within the first 120° of the arc of swing of the door; however, any further movement before stopping and holding necessitates that the 180° type be employed. This can be readily understood when it is known that the relative movement of the parts of the pivot of the 90° type is very slight after the door has been opened 120°, whereas, on the contrary, the relative movement between the parts comprising the 180° type is very slight until after the door has been opened 120°. It is to be noted that the holding arms whether employed with or without door closers may be mounted on either side of the door, that is, on the hinge side or on the side opposite that of the hinge side, differences in the side of mounting only necessitating different types of mounting brackets. Referring to Figures 3 and 4, it will be noted that the device represented there is mounted on the side opposite the hinge side, the bracket 25 being attached to the soffit of the door frame, and that the device shown in Figures 1 and 2 are mounted on the hinge side. Attention is called to the fact that in either case the adjustable arm shown at 19 extends toward the door knob side of the door and is attached remote from the hinges as compared with the attachment of arm 16.

To effect an adjustment, it is merely necessary to loosen the nut 41 and then turn the bolt, thereby causing the cam washer 31 to be displaced angularly to present the maximum thickness of its cam face in a new position which will consequently cause the wedging and the stopping of the door according to the new adjustment.

When the device is supplied from the factory, the cam washer 31 is initially in such a position that an adjustment is effected by merely attaching the device to the door and door frame respectively, opening the door to the desired extent after the nut 41 has been loosened which permits the cam to slip, and in this position tighten the nut 41 to hold it immovable relative to the head 28. This having been done, the device is adjusted to stop and hold the door in the position at which the adjustment is made.

I claim:

In a door holding device, a pair of arms, adapted to be pivotally attached to a door and door frame respectively, said arms being pivoted together, one of said pivots comprising a yoke on one of said arms having opposed flat faces, and a head on the part pivoted to said yoke having a flat face on one side and a spiralled cam face on its opposite side, said head being located between the flat faces of said yoke with its flat face in contact with one of the flat faces of said yoke, and an independent head having a flat face on one side and a cooperating spiral cam face on its other side, located between said first named head and the opposite face of said yoke with its spiral cam face in contact with said first named spiral cam face and immovable relative to said yoke, the distance between the faces of said yoke being such that a predetermined amount of movement of one cam face on the other cam face is permitted, whereas a binding of the parts is caused upon additional movement, and means for adjusting angularly the position of said second head relative to said yoke.

Signed at Chicago, Illinois, this 30 day of Sept., 1926.

DAVID R. LASIER.